US009310199B2

(12) United States Patent
Schofield et al.

(10) Patent No.: US 9,310,199 B2
(45) Date of Patent: *Apr. 12, 2016

(54) MICROMACHINED GYROSCOPES WITH 2-DOF SENSE MODES ALLOWING INTERCHANGEABLE ROBUST AND PRECISION OPERATION

(71) Applicant: The Regents of the University of California, Oakland, CA (US)

(72) Inventors: Adam Schofield, Irvine, CA (US); Alexander Trusov, Irvine, CA (US); Andrei Shkel, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/866,719

(22) Filed: Apr. 19, 2013

(65) Prior Publication Data

US 2013/0233076 A1 Sep. 12, 2013

Related U.S. Application Data

(62) Division of application No. 12/605,178, filed on Oct. 23, 2009, now Pat. No. 8,549,915.

(51) Int. Cl.
*G01C 19/56* (2012.01)
*G01C 19/5733* (2012.01)

(52) U.S. Cl.
CPC ............ *G01C 19/56* (2013.01); *G01C 19/5733* (2013.01)

(58) Field of Classification Search
CPC .... G01C 19/56; G01C 19/5733; H01L 41/08; G01P 3/44; G01P 15/02
USPC .............................. 73/504.12, 504.14, 504.04
See application file for complete search history.

(56) References Cited

U.S. PATENT DOCUMENTS

| 6,915,693 | B2 * | 7/2005 | Kim et al. ................. | 73/504.12 |
|---|---|---|---|---|
| 7,284,430 | B2 * | 10/2007 | Acar et al. ................ | 73/504.12 |
| 8,256,290 | B2 * | 9/2012 | Mao .......................... | 73/504.12 |
| 8,549,915 | B2 * | 10/2013 | Schofield et al. ......... | 73/504.12 |
| 8,800,370 | B2 * | 8/2014 | Schofield et al. ......... | 73/504.12 |
| 2002/0134154 | A1 * | 9/2002 | Hsu et al. .................. | 73/504.04 |
| 2004/0177689 | A1 * | 9/2004 | Cho ......................... | 73/504.14 |
| 2005/0199061 | A1 * | 9/2005 | Acar et al. ................ | 73/504.02 |
| 2006/0032308 | A1 * | 2/2006 | Acar et al. ................ | 73/504.12 |
| 2007/0131030 | A1 * | 6/2007 | Jeong et al. .............. | 73/504.12 |
| 2010/0083756 | A1 * | 4/2010 | Merz et al. ............... | 73/504.12 |

* cited by examiner

*Primary Examiner* — Helen Kwok
(74) *Attorney, Agent, or Firm* — Marcus C. Dawes; Daniel L. Dawes

(57) ABSTRACT

A z-axis gyroscope design is presented with a 2-degree of freedom (DOF) sense mode allowing interchangeable operation in either precision (mode-matched) or robust (wide-bandwidth) modes. This is accomplished using a complete 2-DOF coupled system which allows for the specification of the sense mode resonant frequencies and coupling independent of frequency. By decoupling the frame connecting the sense system to a central anchor, x-y symmetry is preserved while enabling a fully coupled 2-DOF sense mode providing control over both the bandwidth and the amount of coupling independent of operational frequency. The robust mode corresponds to operation between the 2-DOF sense mode resonant frequencies providing a response gain and bandwidth controlled by frequency spacing. Precision mode of operation, however, relies on mode-matching the drive to the second, anti-phase sense mode resonant frequency which can be designed to provide a gain advantage over a similar 1-DOF system.

1 Claim, 9 Drawing Sheets

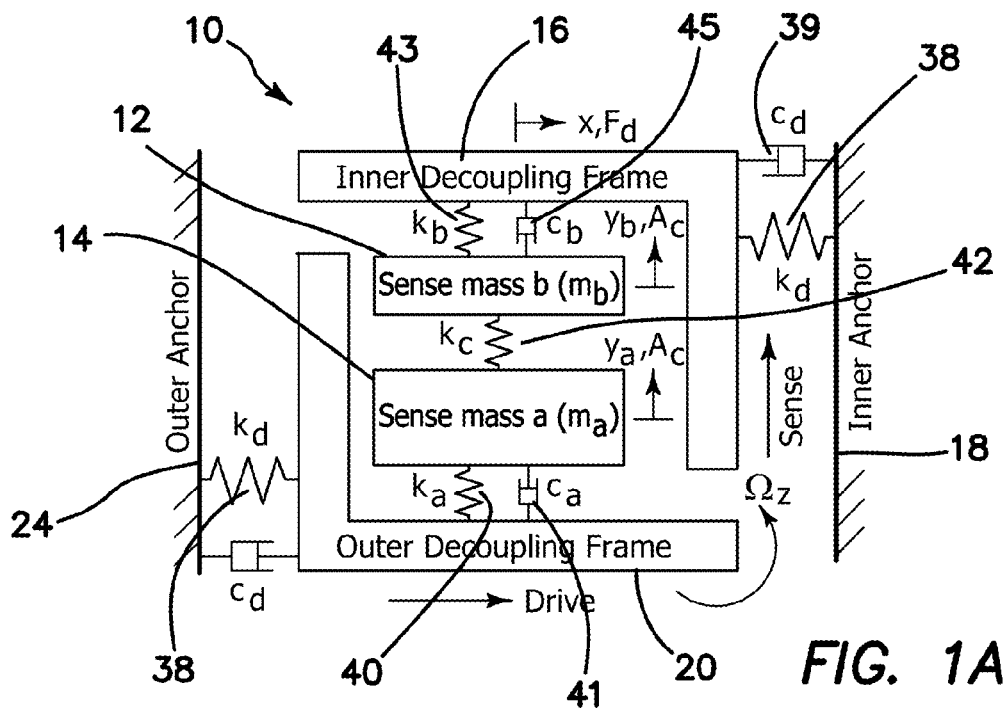
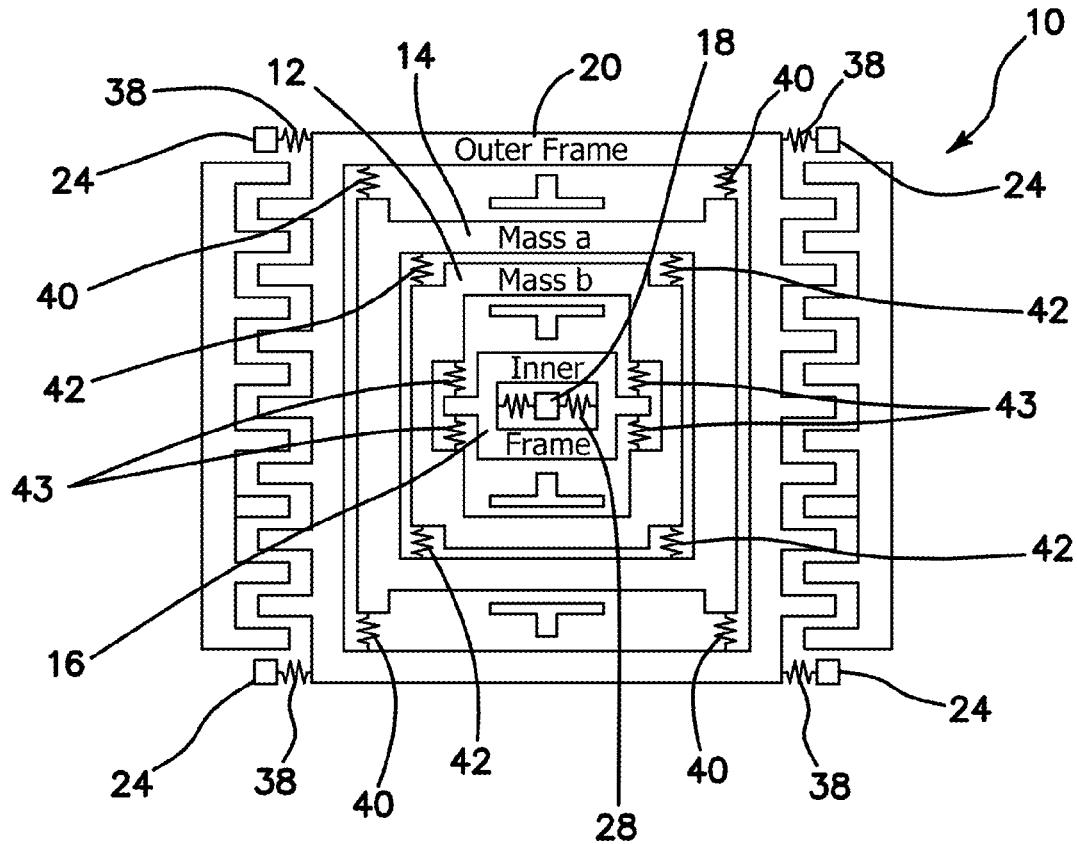
FIG. 1A
FIG. 1B

MICROMACHINED GYROSCOPES WITH 2-DOF SENSE MODES ALLOWING INTERCHANGEABLE ROBUST AND PRECISION OPERATION

RELATED APPLICATIONS

The present application is a divisional of U.S. patent application Ser. No. 12/605,178, filed on Oct. 23, 2009, which is incorporated herein by reference and to which priority is claimed pursuant to 35 USC 120.

STATEMENT OF GOVERNMENT SUPPORT

This invention was made with Government support under Grant No. 0409923, awarded by the National Science Foundation. The Government has certain rights in this invention.

BACKGROUND OF THE INVENTION

1. Field of the Invention

The invention relates to the field of micromachined gyroscopes, in particular gyroscope designs with 2-DOF (two degrees of freedom) sense modes allowing interchangeable operation in either precision or robust modes.

2. Description of the Prior Art

Micromachined vibratory gyroscopes operate based on the Coriolis effect where a rotation induced energy transfer occurs between two orthogonal vibrational modes, commonly referred to as drive and sense. Conventionally, these modes are realized as single degree of freedom (DOF) dynamic systems with their own associated resonant frequencies giving rise to two differing methods of operation: mode-matched or mismatched. In mode-matched devices, the drive and sense resonant frequencies are equal allowing the output of the sensor to be increased proportional to the sense mode quality factor, thereby yielding higher sensitivities at the cost of reduced bandwidth and robustness. Operation with the resonant frequencies separated by some prescribed amount, or mode-mismatched, is more common, particularly for automotive applications where robustness is critical.

Previously, gyroscope designs have been introduced aimed at robust operation using an expanded sense-mode design space through increased degrees of freedom. Specifically, these devices use two coupled sense masses forming a 2-DOF dynamic system with two sense mode resonant frequencies and a wide region of constant amplitude between them. While the gain and the bandwidth of this operational region is controlled solely by the resonant frequency spacing, a constraint limited the minimal achievable spacing as the operational frequency of device with fixed size was increased. This is a direct effect of the dynamic vibration absorber type 2-DOF design, which utilized only two suspensions thereby eliminating the ability to independently define the frequency spacing and the coupling between the masses. In contrast, a complete 2-DOF system consisting of two masses and three suspensions alleviates this issue allowing for the arbitrary specification of frequency spacing independent of operational frequency.

What is needed is a interchangeable micromachined gyroscope that allows for both increased sensitivity and wide-bandwidth, robust operation in a single device.

BRIEF SUMMARY OF THE INVENTION

The current invention is for a micromachined z-axis vibratory rate gyroscope comprising a first 1-DOF drive subsystem restrained to oscillate substantially only in the drive mode, and having a drive suspension and drive mass, and a 2-DOF sense subsystem restrained to oscillate substantially only in the sense mode, having at least two sense mode resonant frequencies and resiliently coupled to the 1-DOF drive subsystem, where the 1-DOF drive subsystem has a drive frequency independent of the at least two sense mode resonant frequencies, which drive frequency is determined by selection of dynamic parameters for the drive suspension and drive mass.

The 1-DOF drive subsystem of the gyroscope comprises an outer anchor, an inner anchor, an outer decoupling frame coupled to the outer anchor by at least one drive suspension that constrains the motion of the outer decoupling frame to substantially only the drive axis, and an inner decoupling frame coupled to the inner anchor and at least one drive suspension that constrains the motion of the outer decoupling frame to substantially only the drive axis.

The 2-DOF sense subsystem of the gyroscope comprises a first sense mass $m_a$ coupled to one of either the inner decoupling frame or the outer decoupling frame and restrained to oscillate substantially only in the sense direction, a second sense mass $m_b$ coupled to the other one of either inner decoupling frame or outer decoupling frame and restrained to oscillate substantially only in the sense direction, and an independent flexure coupling the first and second sense masses to allow relative motion of the first and second sense masses $m_a$ and $m_b$ in substantially only in the sense direction.

The 1-DOF drive subsystem of the gyroscope further comprises a drive electrostatic comb electrode for the actuation, detection and control of the inner and outer decoupling frames in the drive axis.

The 2-DOF sense subsystem of the gyroscope further comprises a sense electrostatic electrode for the actuation, detection of the motion induced by the Coriolis acceleration and for tuning of the resonant frequencies of the first and second sense masses. The 2-DOF sense subsystem further comprises means for independently controlling both peak spacing of the at least two sense mode resonant frequencies and the amount of coupling between the first and second sense masses.

The dynamic parameters of the 2-DOF sense subsystem of the gyroscope are selected so that the at least two resonant sense frequencies having a peak spacing with a predetermined bandwidth and where the dynamic parameters of the 1-DOF drive subsystem are selected to establish the drive frequency within the predetermined bandwidth for a robust operational mode.

Alternatively, the dynamic parameters of the 2-DOF sense subsystem of the gyroscope are selected so that the at least two resonant sense frequencies are predetermined and where the dynamic parameters of the 1-DOF drive subsystem are selected to establish the drive frequency on or near at least one of the at least two resonant sense frequencies for a precision operational mode.

The gyroscope further comprises first means for adjusting the dynamic parameters of the 1-DOF subsystem and/or 2-DOF subsystem during operation for a precision operational mode where the dynamic parameters of the 2-DOF sense subsystem are selected so that the at least two resonant sense frequencies are predetermined and where the dynamic parameters of the 1-DOF drive subsystem are selected to establish the drive frequency on or near at least one of the at least two resonant sense frequencies, or for adjusting the dynamic parameters of the 1-DOF subsystem and/or 2-DOF subsystem during operation for a robust operational mode where the dynamic parameters of the 2-DOF sense subsystem are selected so that the at least two resonant sense frequencies having a peak spacing with a predetermined bandwidth and where the dynamic parameters of the 1-DOF drive subsystem are selected to establish the drive frequency within the predetermined bandwidth.

The current invention also provides for a method of operating an interchangeable micromachined z-axis vibratory rate gyroscope capable of operating in a robust mode where a drive frequency of a 1-DOF drive subsystem of the gyroscope is established in a peak spacing between at least two resonant sense frequencies with a predetermined bandwidth of a 2-DOF sense subsystem of the gyroscope and capable of operating in a precision mode where a drive frequency of the 1-DOF drive subsystem of the gyroscope is established on or near one of the at least two resonant sense frequencies of the 2-DOF sense subsystem of the gyroscope, comprising interchangeably switching between the robust mode and the precision mode during real-time operation.

The method of operating an interchangeable micromachined z-axis vibratory rate gyroscope further comprises operating in the robust mode where the drive frequency of the 1-DOF drive subsystem of the gyroscope is established in the peak spacing between at least two resonant sense frequencies with the predetermined bandwidth of the 2-DOF sense subsystem of the gyroscope after switching from the precision mode.

In an alternative embodiment, the method of operating an interchangeable micromachined z-axis vibratory rate gyroscope further comprises operating in the precision mode where the drive frequency of the 1-DOF drive subsystem of the gyroscope is established on or near one of the at least two resonant sense frequencies of the 2-DOF sense subsystem of the gyroscope after switching from the robust mode.

In an alternative embodiment, the method step of where interchangeably switching between the robust mode and the precision mode during real-time operation comprises operating the gyroscope in the robust mode by selection of the dynamic parameters of the 1-DOF drive subsystem and the 2-DOF sense subsystem and electrostatically tuning the 2-DOF sense subsystem to switch to the precision mode of operation.

In yet another embodiment, the method step of where interchangeably switching between the robust mode and the precision mode during real-time operation comprises operating the gyroscope in the precision mode by selection of the dynamic parameters of the 1-DOF drive subsystem and the 2-DOF sense subsystem and electrostatically tuning the 2-DOF sense subsystem to switch to the robust mode of operation. Alternatively, this method step may further comprise detecting the switching between the robust mode and the precision mode during real-time operation by measuring quadrature magnitude output of the gyroscope.

In an alternative embodiment of the gyroscope, the gyroscope outline above further comprises a second 1-DOF drive subsystem restrained to oscillate substantially only in the drive mode, and having a corresponding drive suspension and corresponding drive mass and a second 2-DOF sense subsystem restrained to oscillate substantially only in the sense mode, having at least two corresponding sense mode resonant frequencies, and resiliently coupled to the second 1-DOF drive subsystem, where the second 1-DOF drive subsystem has a drive frequency independent of the at least two corresponding sense mode resonant frequencies, which corresponding drive frequency is determined by selection of dynamic parameters for the corresponding drive suspension and corresponding drive mass, and wherein the first and second 1-DOF subsystems are resiliently coupled to each in the drive mode, but capable of being driven in antiphase to reject common mode inputs.

The 1-DOF drive subsystem of the alternative embodiment of the gyroscope further comprises a corresponding drive electrostatic comb electrode for the actuation, detection and control of the inner and outer decoupling frames in the drive axis. Additionally, the second 2-DOF sense subsystem of the gyroscope further comprises a corresponding sense electrostatic electrode for the actuation, detection of the motion induced by the Coriolis acceleration and for tuning of the resonant frequencies of the first and second sense masses.

The alternative embodiment of the gyroscope outlined above further comprises corresponding second means for adjusting the dynamic parameters of the second 1-DOF subsystem and/or second 2-DOF subsystem during operation for a precision operational mode where the dynamic parameters of the second 2-DOF sense subsystem are selected so that the at least two corresponding resonant sense frequencies are predetermined and where the corresponding dynamic parameters of the second 1-DOF drive subsystem are selected to establish the corresponding drive frequency on or near at least one of the at least two corresponding resonant sense frequencies, or for adjusting the dynamic parameters of the second 1-DOF subsystem and/or second 2-DOF subsystem during operation for a robust operational mode where the corresponding dynamic parameters of the second 2-DOF sense subsystem are selected so that the at least two corresponding resonant sense frequencies having a peak spacing with a predetermined bandwidth and where the dynamic parameters of the second 1-DOF drive subsystem are selected to establish the corresponding drive frequency within the predetermined corresponding bandwidth.

The current invention also provides for yet another micromachined z-axis vibratory rate gyroscope formed on a substrate comprising an outer decoupling drive frame restrained to oscillate substantially only in a drive direction, an inner decoupling drive frame restrained to oscillate substantially only in a drive direction, the inner and outer decoupling drive frames being decoupled from each other and both resiliently coupled to the substrate, a first sense mass $m_a$ resiliently coupled to the outer decoupling drive frame and restrained to oscillate substantially only in the sense direction, a second sense mass $m_b$ resiliently coupled to the outer decoupling drive frame and restrained to oscillate substantially only in the sense direction, the first and second sense masses $m_a$ and $m_b$ being independently resiliently coupled to each other to allow relative oscillation in the sense direction, a drive electrostatic comb coupled to either the inner decoupling drive frame or the outer decoupling frame or both, and a sense electrostatic comb coupled to either the first sense mass or the second sense mass or both.

The current device is a new, z-axis micromachined gyroscope design that takes advantage of a complete 2-DOF coupled sense mode allowing independent adjustment of both the sense mode resonant frequencies and the amount of coupling between the masses. This is accomplished through the introduction of a second, inner decoupling frame connected to a central anchor.

Furthermore, the complete 2-DOF sense mode enables a new operational method where the drive mode can be interchangeably placed between the sense mode peaks (called a "robust mode") or mode-matched to one of the 2-DOF sense mode resonant frequencies (called a "precision mode"). The control of bandwidth and coupling allows each mode to be independently tailored in order to meet application specific objectives and allows the user adjust the output to the changing environmental conditions.

The disclosed device takes advantage of a complete, fully coupled 2-DOF sense system which, unlike the previous implementations found in the prior art, allows for the specification of the sense mode resonant frequencies and amount of coupling independent of operational frequency. This also eliminates the undesirable scaling effects that were a direct effect of the previous 2-DOF sense mode design. Additionally, the new design concepts presented herein enable a new operational paradigm allowing for interchangeable operation in both robust and precision modes.

The robust mode corresponds to operation between the 2-DOF sense mode resonant frequencies; this provides a response gain and bandwidth controlled by mechanical design through adjustment of the sense mode frequency spacing.

The precision mode of operation relies on mode-matching to one of the sense mode resonant frequencies. This resonant peak can be designed to provide a gain advantage over comparable 1-DOF systems through adjustment of the coupling between the masses. The precision mode gain can also be increased independent of the robust mode gain and bandwidth by decreasing the atmospheric pressure in which the device operates. Also, matching to the second, anti-phase resonance eliminates substrate energy dissipation enabling higher achievable sensitivities. Thus, the presented concepts are essential to enabling the interchangeable operation due to the independent tuning of the robust and precision mode gains.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 1a is a schematic diagram of the dynamic elements of the gyroscope.

FIG. 1b is a schematic diagram of the structural organization of the micormachined gyroscope with 2-DOF sense modes allowing interchangeable robust and precision operation in real-time.

Figure 2A:
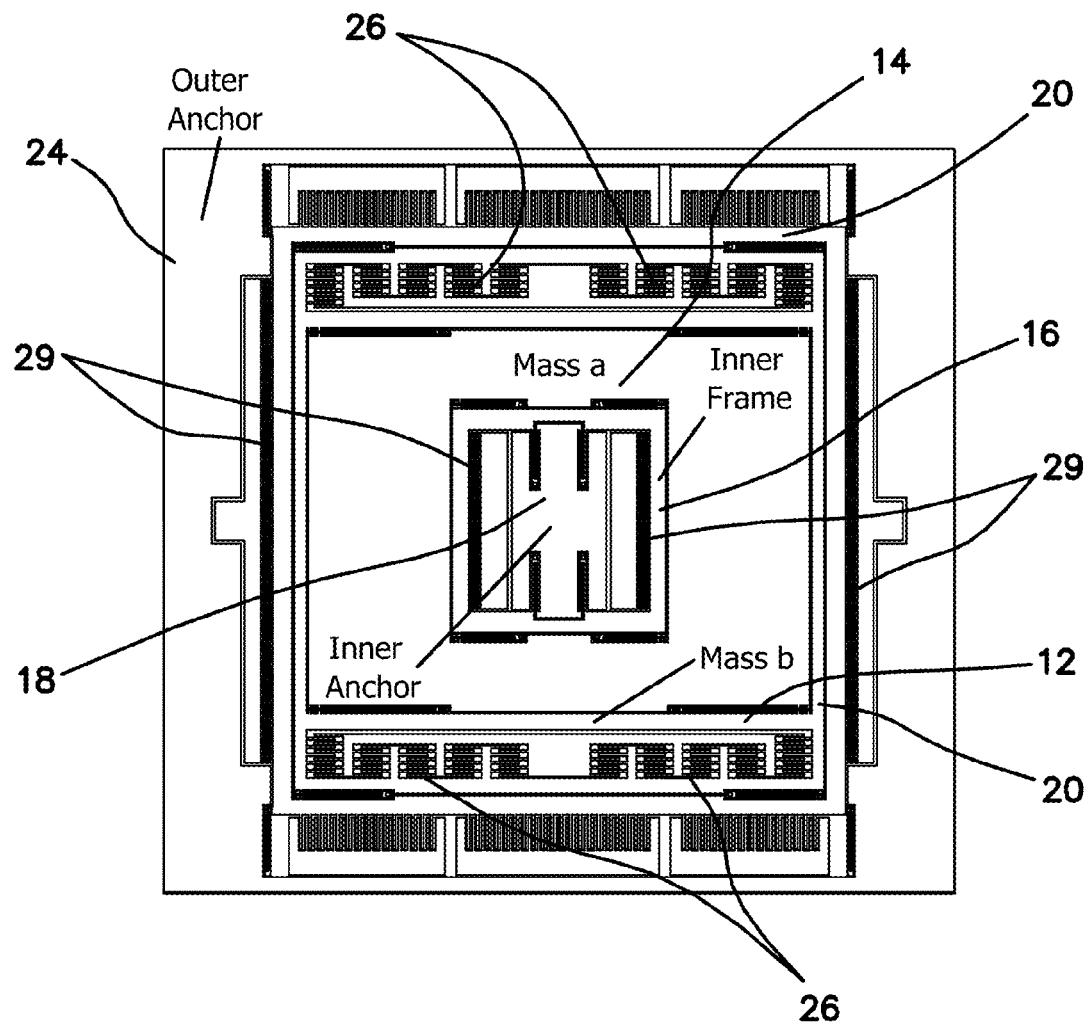
FIG. 2a is a top plan view of an embodiment of the gyroscope with a smaller second sense mass and a larger inner decoupled frame comprising a plurality of capacitive electrodes.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Lumped structural models of the new gyroscope concept is presented in FIGS. 1a and 1b. The gyroscope is generally denoted by reference numeral 10. The device, like previous multi-DOF sense mode devices, is comprised of a conventional drive mode that is mechanically decoupled from a 2-DOF sense mode dynamic system formed by the two coupled sense masses, $m_a$ 14 and $m_b$ 12. Sense mass $m_b$ 12 is also known as a detection mass. The gyroscope 10 further comprises a third suspension element, namely an outer decoupling frame 20 in the sense mode forming a complete 2-DOF coupled system. The outer decoupling frame 20 is coupled to an outer anchor 24 by a plurality of drive suspension elements 38. The suspension elements 38 constrain the motion of the outer decoupling frame 20 to only along the drive axis. Due to the frame decoupling and symmetry of the design, the addition of the outer decoupling frame 20 is made possible through the use of a second, inner decoupling frame 16 suspended in the drive mode relative to a central or inner anchor 18 seen in FIG. 1b. The inner decoupling frame 16 is similarly coupled to an inner anchor 18 by drive suspension elements 28 which constrain the motion of the inner decoupling frame 16 to only the drive axis.

Damping between outer frame 20 and the substrate or outer anchor and inner frame 16 and the substrate or inner anchor 18 is represented by dampers $c_d$, 39 in FIG. 1a. Damping between sense mass $m_a$ 14 and outer frame 20 is represented by damper $c_a$, 41 in FIG. 1a. Damping between sense mass $m_b$ 12 and inner frame 16 is represented by damper $c_b$, 45 in FIG. 1a.

The first sense mass $m_a$ 14 is coupled to the outer decoupling frame 20 by sense suspension elements 40. Similarly, the second sense mass $m_b$ 12 is coupled to the inner decoupling frame 16 by sense suspension elements 43. The first and second sense masses $m_a$ 14 and $m_b$ 12 are coupled together by a coupling flexure 42 that can be adjusted independently of the other drive and sense suspensions 28, 38, 40, 43.

Figure 2B:
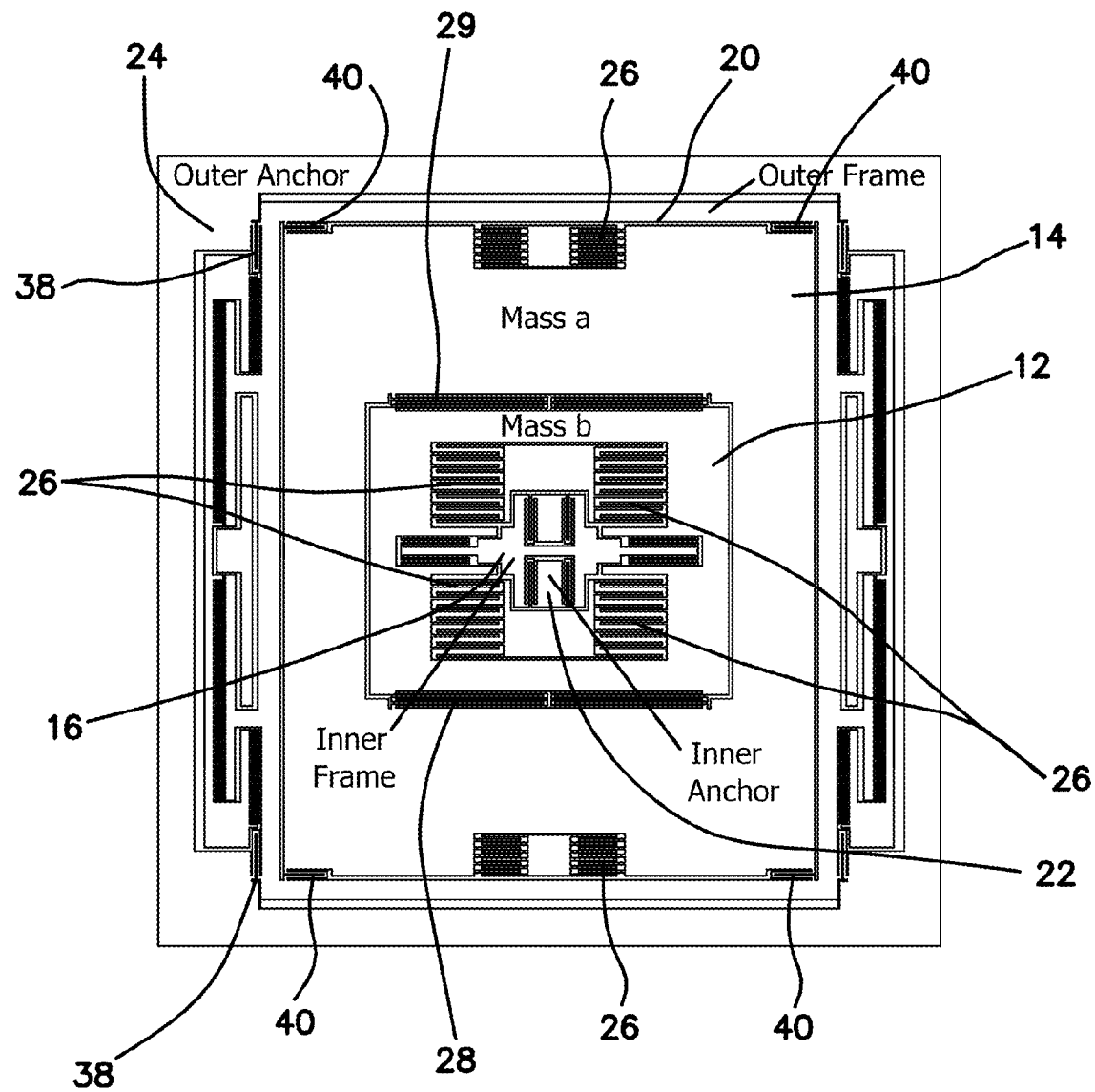
FIG. 2b is a top plan view of an embodiment of the gyroscope with capacitive electrodes both first and second sense masses and a smaller inner decoupling frame with no electrodes.

Several different physical layout implementations of the proposed gyroscope concept have been considered and implemented; two of these embodiments are presented in FIGS. 2a and 2b. The first embodiment, FIG. 2a, contains a plurality of lateral comb electrodes 29 on both the inner and outer decoupling frames 16, 20, as well as a plurality of parallel plate electrodes 26 on the outer frame 20 for resonant frequency tuning. Also, the smaller sense mass $m_b$ 12 is placed on the outside of sense mass $m_a$ 14 to increase the number of parallel plate electrodes 26 and for easier wire-bonding access to the gyroscope 10.

The second embodiment, FIG. 2b, is implemented with a much smaller inner frame 16 with no electrodes. A plurality of lateral comb electrodes 29 and a plurality of parallel plate electrodes 26 are disposed on the outer sense mass $m_a$ 14 for actuation, detection, and tuning. Additionally, a plurality of parallel plate electrodes 26 are disposed on the inner sense mass $m_b$ 12 for detection, control, and tuning.

The complete 2-DOF sense mode provides the device with distinct advantages over the previous multi-DOF designs found in the prior art which relied on only two suspensions. This includes the ability to achieve the desired sense mode resonant frequencies independent of operational frequency as well as control over the degree of coupling between the sense masses.

Since the drive mode of the illustrated disclosure is a conventional 1-DOF resonant system, the desired operational frequency, $\omega_d$, can be obtained independently of the sense mode through adjustment of the drive suspension or mass of the inner and outer decoupling frames 16, 20. On the other hand, the sense mode is a coupled 2-DOF system where the natural frequencies are determined by eigenvalues in terms of the structural frequencies $\omega^2_a = (k_a + k_c)/m_a$ and $\omega^2_b = (k_b + k_c)/m_b$, as well as the coupling between the masses, $\omega^2_c = k_c/\sqrt{(m_a m_b)}$. If the desired sense mode resonant frequencies, $\omega_{1,2}$ are specified in terms of the drive frequency, $\omega_d$, and the sense mode frequency spacing, $\Delta = \omega_2 - \omega_1$, the following sense mode design equations can be found, $$\omega_{a,b}^2 = \omega_d^2 + \left(\frac{\Delta}{2}\right)^2 \pm \sqrt{\omega_d^2 \Delta^2 - \omega_c^4}, \quad (1)$$

which assumes the drive is equally spaced from the sense mode resonances.

As shown in equation (1), the amount of coupling between the masses, $\omega^2_c$, can be adjusted independently from the structural frequencies. There is, however, a limited range of values that can be specified while maintaining a physically meaningful system. Therefore, the coupling can be expressed in terms of a percentage of the maximum coupling $$\omega_c^2 = \epsilon \omega_d \Delta, \text{ where } 0 < \epsilon < 1, \quad (2)$$

where $\epsilon$ is the coupling parameter. Substituting (2) into (1) gives, $$\omega_{a,b}^2 = \omega_d^2 + \left(\frac{\Delta}{2}\right)^2 \pm \omega_d \Delta \sqrt{1 - \epsilon^2}, \quad (3)$$

which are the sense mode design equations in terms of desired operational frequency, $\omega_d$, sense mode resonant frequency spacing, $\Delta$, and the amount of coupling, $\epsilon$. From equations (3) and (2), the stiffnesses required to achieve the desired parameters can be found, $$k_a = \omega_a^2 m_a - k_c,$$

$$k_b = \omega_b^2 m_b - k_c,$$

$$k_c = \epsilon \omega_d \Delta \sqrt{m_a m_b},$$

assuming the value of the sense masses 12, 14 are known.

Figure 3:
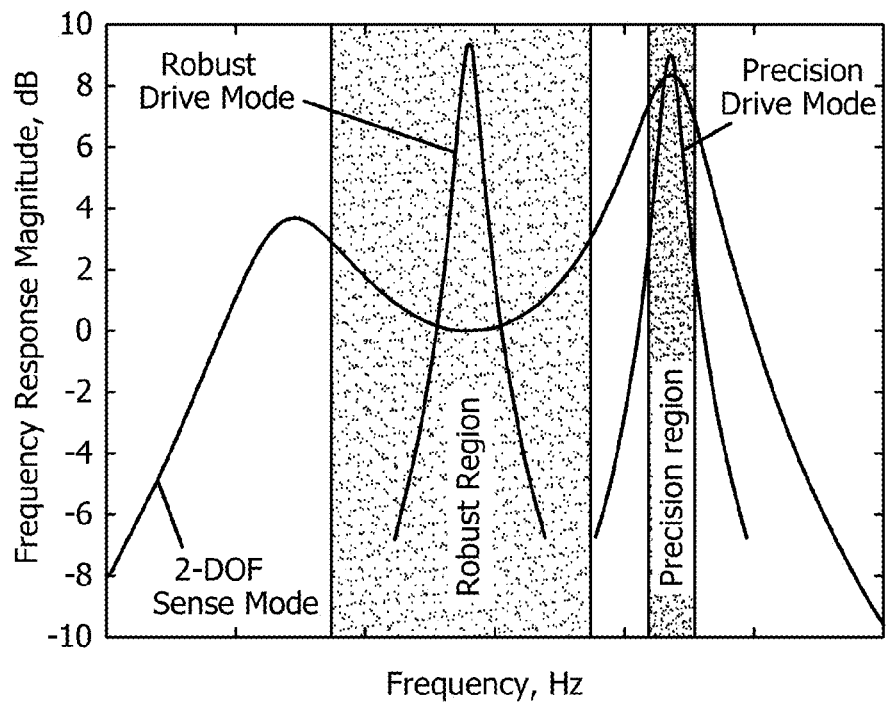
FIG. 3 is a graphical representation of frequency response magnitude in dB versus frequency in Hz for the drive and sense mode frequency responses highlighting the robust and precision operational regions.

While the current device removes a constraint with earlier implementations, it also introduces a new operational method for multi-DOF gyroscopes: interchangeable operation in both precision and robust modes in a single device. This is enabled by the ability to independently control both the peak spacing and the amount of coupling between the masses 12, 14 of the 2-DOF sense mode. The concept of both robust and precision modes of operation is shown in FIG. 3 which presents the conceptual frequency responses of both the drive and complete 2-DOF sense mode.

Similar to previous multi-DOF devices, the robust mode corresponds to operation in the region between the sense mode resonant frequencies; precision operation, however, the current device consists of mode-matching the drive to the sense mode anti-phase resonant frequency. As with conventional devices, the resonant amplitude of the precision mode can be increased with decreasing pressures resulting in higher sensitivities whereas the amplitude of the robust region is mainly a function of resonant frequency spacing. Thus, the gains of each mode can be controlled independently enabling both high sensitivity and robust, wide-bandwidth operation at reduced pressures.

Figure 4:
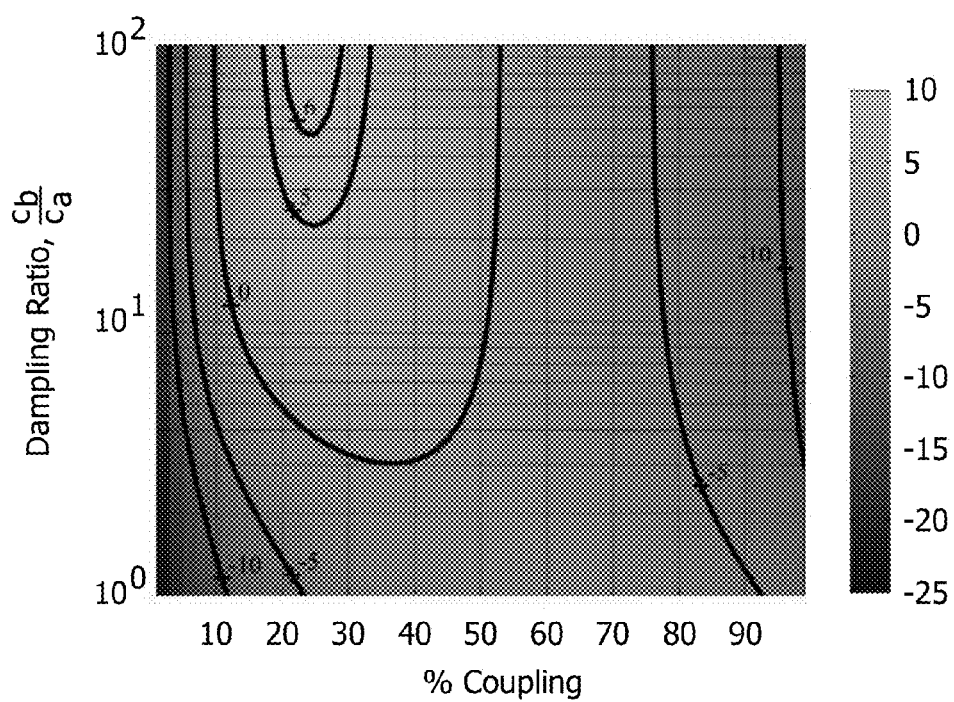
FIG. 4 is a graphical representation of damping ratio versus percentage coupling for the gain ratio of the 2-DOF sense mode of the current gyroscope versus 1-DOF sense modes found in the prior art.

The current device also comprises means for obtaining increased resonant gain over an equivalent 1-DOF sense mode for similar damping conditions. This is illustrated with the simulation results graphed in FIG. 4 showing the gain ratio in dB between the 2-DOF anti-phase resonant frequency and a 1-DOF system of $m_a + m_b$ at the same frequency. In the simulation, the total damping $c_a + c_b$, corresponding to a 1-DOF quality factor of 500, remained fixed for changes in the coupling parameter, $\epsilon$, and the 2-DOF damping ratio, $c_b/c_a$. There exists design parameters where the 2-DOF system has over a 6 dB gain advantage versus the equivalent 1-DOF system. This advantage is achieved with larger damping on the detection mass $m_b$ 12 meaning that increasing the sensing capacitance, i.e. more sensing plates or smaller capacitive gaps, is advantageous for the presented design.

Figure 5:
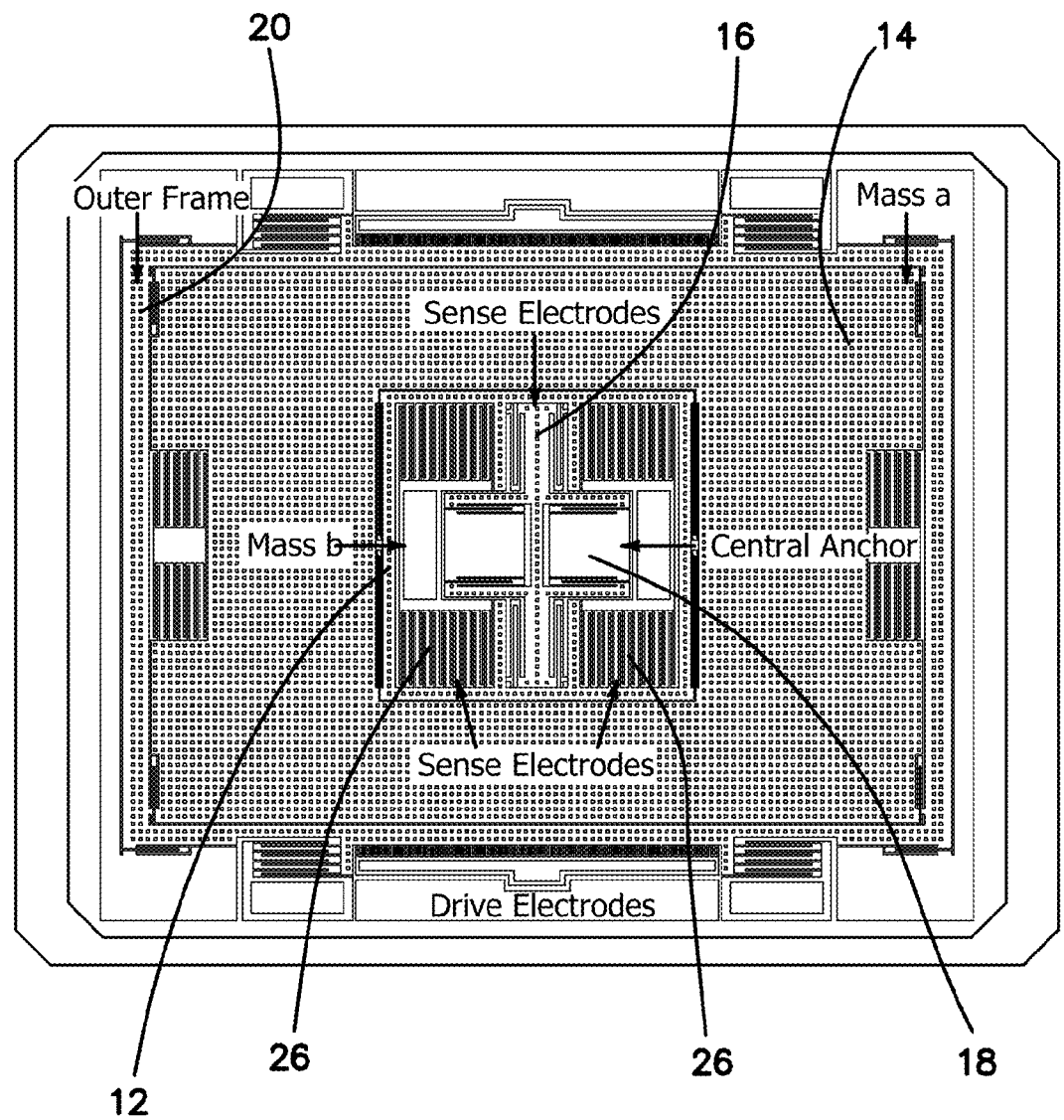
FIG. 5 is an example layout of the micromachined gyroscope.

Prototypes of the disclosed gyroscope device used for the experimental characterization presented below were fabricated using an in-house, two mask, wafer scale SOI process with a conductive 50 μm device layer and a 5 μm buried oxide. First, a front side metallization process defined bonding pads via lift-off followed by a Deep Reactive Ion Etching (DRIE) step using a Surface Technology Systems (STS) Advanced Silicon Etching (ASE) tool. The minimum feature size of the overall process used to define the capacitive gaps was 5 μm. The perforated structures were released using a timed HF etch followed by dicing, packaging, and wire bonding. A scanning electron micrograph of a fabricated prototype of the current device is presented in FIG. 5.

Several different sense mode systems were designed with varying degrees of coupling between the masses 12, 14 in order to determine its affect on the response gain. Experimental frequency responses in air and vacuum are presented in FIG. 6 for both high and low stiffness sense modes. For atmospheric operation, the low stiffness system is optimal as it provides a higher precision mode gain improvement (10 dB versus 7 dB) versus the 240 Hz wide robust gain regions. At vacuum, however, the high coupling stiffness system provides the larger precision mode improvement of more than 40 dB versus the robust region. Thus, for vacuum operation, a high stiffness system is desirable as it provides over 50 times improvement in precision mode operation versus atmospheric pressure.

The disclosed device was characterized using constant angular rates in order to verify its functionality as a gyroscope 10 for both robust and precision modes. The paragraphs below detail the biasing used for the experiment, a method of mode tuning for switching between the operational modes, and finally the scale factor calibration for both modes.

Figure 7:
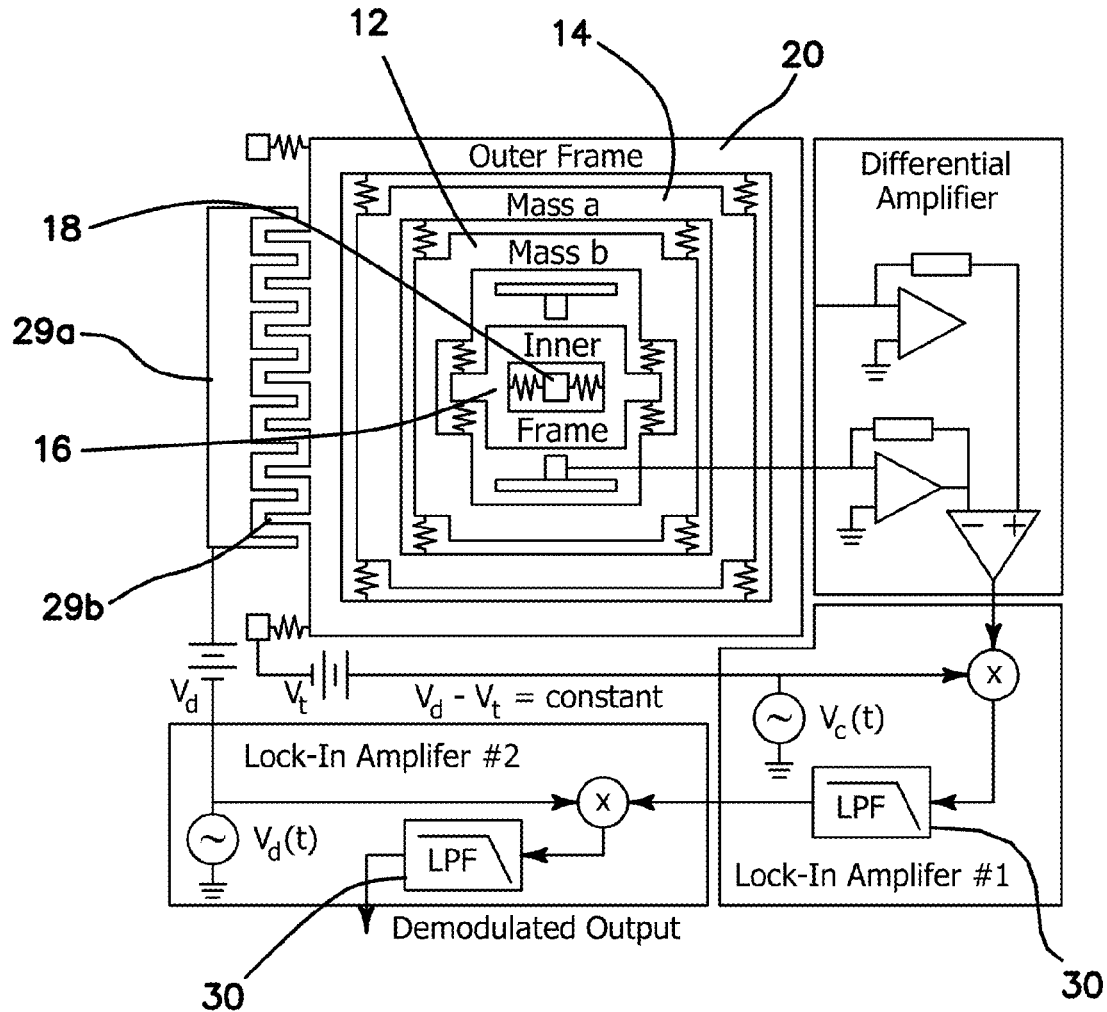
FIG. 7 is a schematic diagram of the actuation and detection architecture used for the micromachined gyroscope.

FIG. 7 presents a schematic of the actuation and detection scheme used for the angular rate experimental characterization. For drive mode actuation, an AC driving voltage, $V_d(t)$, plus a DC potential, $V_d$, was applied to the fixed electrodes 29a while a high frequency AC carrier voltage, $v_c(t)$, plus a sense mode tuning voltage, $V_t$, was applied to the mobile mass of outer frame 20, through electrodes 29b. In order to maintain a constant driving amplitude, the total DC driving potential, $V_d$-$V_t$, was fixed during sense mode tuning experiments.

In the sense mode, a differential detection scheme using cascaded trans-impedance and instrumentation amplifiers was used to pick up the motion of mass $m_b$ 12. The differential signal was then demodulated at the carrier frequency followed by a second demodulation at the drive frequency using AMETEK Model 7265 Lock-In Amplifiers 30 as seen in FIG. 7. The use of the high frequency carrier allows for the separation of useful sense signals from parasitics.

Figure 8:
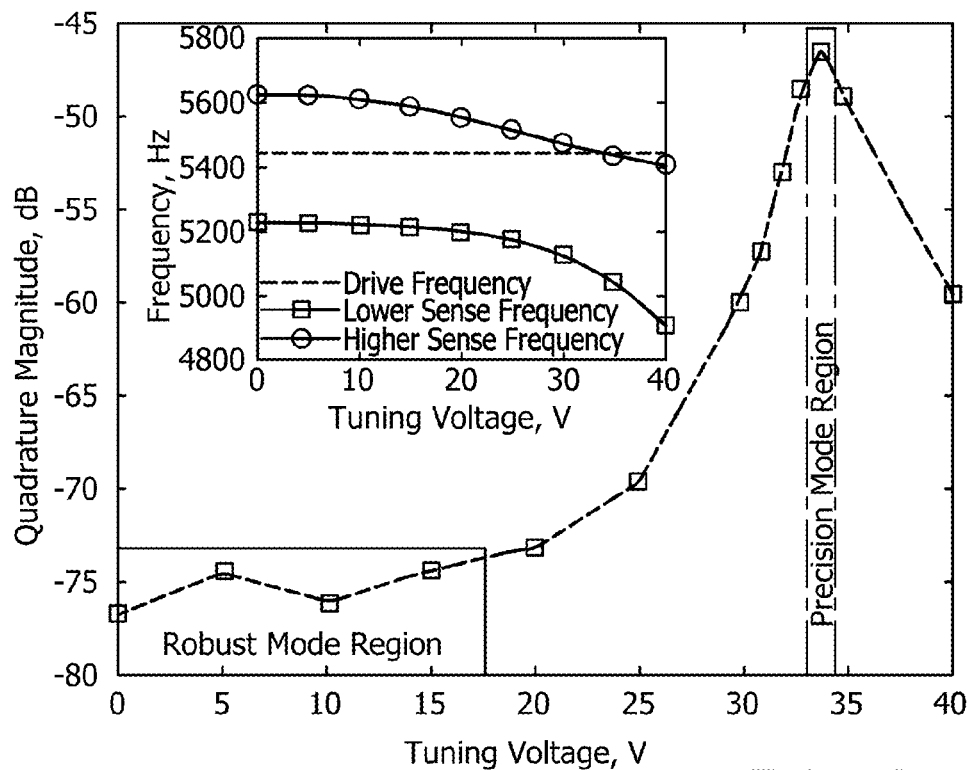
FIG. 8 is a graphical representation of quadrature magnitude in dB versus the tuning voltage for the micromachined gyroscope with an inset of frequency versus tuning voltage for the micromachined gyroscope.
Figure 9:
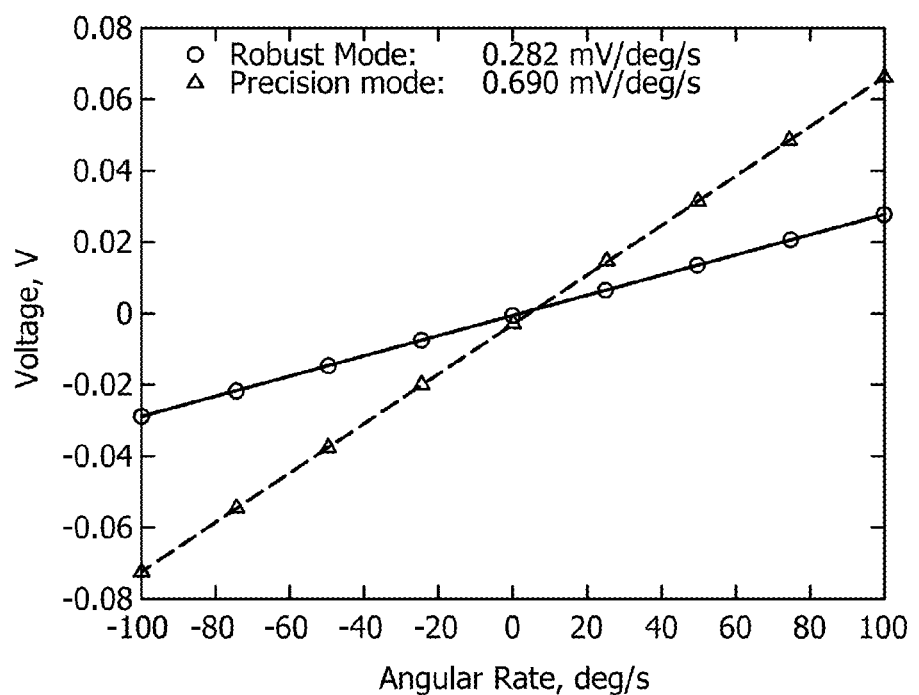
FIG. 9 is a graphical representation of voltage versus angular rate for both robust and precision modes of the micromachined gyroscope in air.

The fabricated gyroscope 10 used in the experimental characterization was designed with the drive mode natural frequency of 5.44 kHz between the lower and higher sense mode resonances of 5.2 and 5.6 kHz respectively. Therefore, mode-matching for the presented gyroscope 10 required electrostatic tuning of the sense mode in order to match the higher anti-phase resonant frequency to the drive. By adjusting the DC tuning voltage, $V_t$, applied to the mass $m_b$ the sense mode resonant frequencies can be shifted down in frequency as shown in the inset of FIG. 8. As the voltage is increased, both sense mode frequencies are shifted until the higher sense mode frequency crosses the drive mode at approximately 35 V.

While the sense mode tuning curves indicate that the gyroscope 10 can be mode-matched, it does not ensure precise matching is achieved. The zero rate output of the gyroscope 10, or quadrature, however, can be monitored for changes in tuning voltage with a maximum output occurring when the drive and sense frequencies are equal. The quadrature output in dB versus tuning voltage is presented in FIG. 8 for the gyroscope 10 operated in 5.6 Torr vacuum. For low tuning voltages (0-15 V), the drive mode is in the robust operational mode between the peaks; as the voltage is increased, the quadrature signal increases until a maximum is achieved at 34 V indicating a mode-matched condition, while even higher voltages result in decreasing signals.

Figure 6:
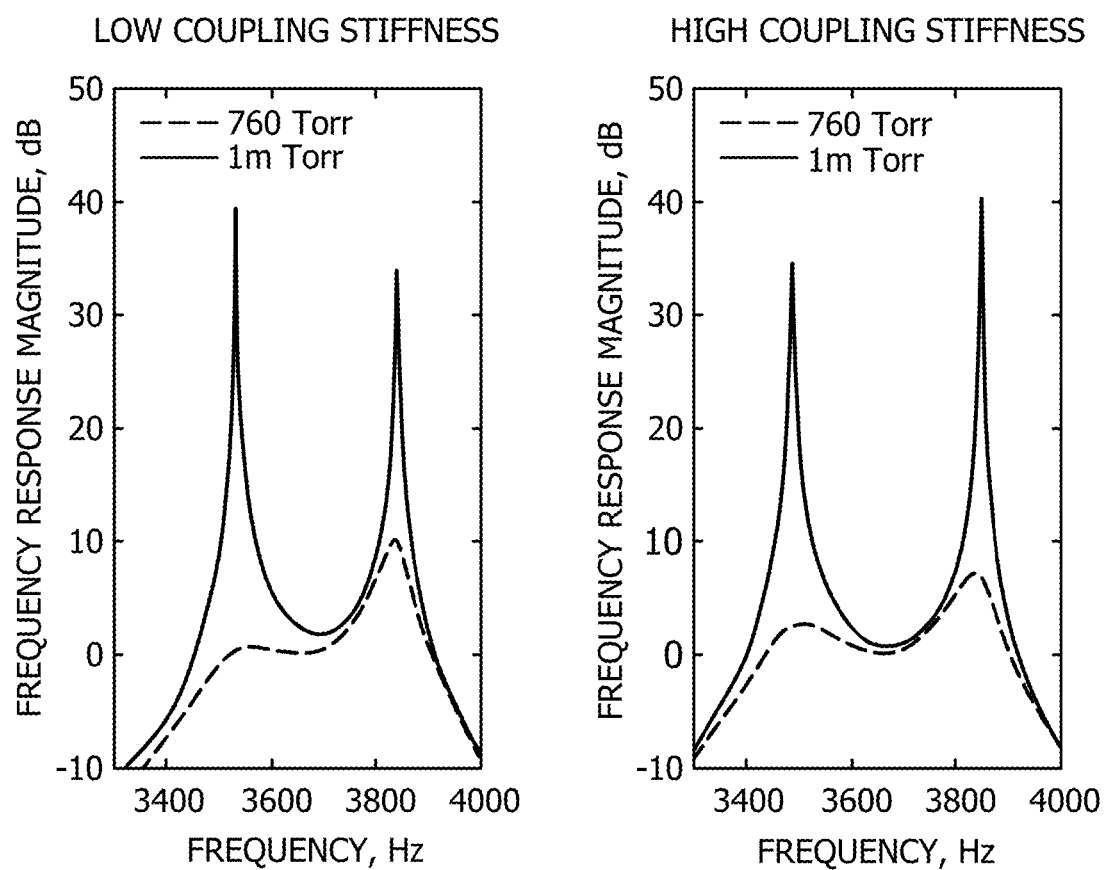
FIG. 6 is a graphical representation of frequency response magnitude versus frequency for sense mode frequency responses in air or ambient conditions and vacuum of the micomachined gyroscope, both for low coupling stiffness and high coupling stiffness as shown in the figure on the left and right graphs respectively.

To verify both operational modes, the gyroscope 10 was characterized in atmospheric pressure at constant angular rates using an Ideal Aerosmith 1291 BR rate table. The actuation and detection scheme shown in FIG. 7 was used with tuning voltages of 0 V and 34 V for robust and precision modes, respectively, while the total driving voltage was kept constant. For robust operation, the experimentally obtained scale factor was 0.282 mV/deg/s while for precision operation it was 0.690 mV/deg/s. Thus, precision mode resulted in a 2.4 times improvement at atmospheric pressure; for operation at 1 mTorr vacuum, however, a possible improvement of 50 times can be obtained for precision mode while leaving the robust region unaffected as shown in FIG. 6.

Figure 10:
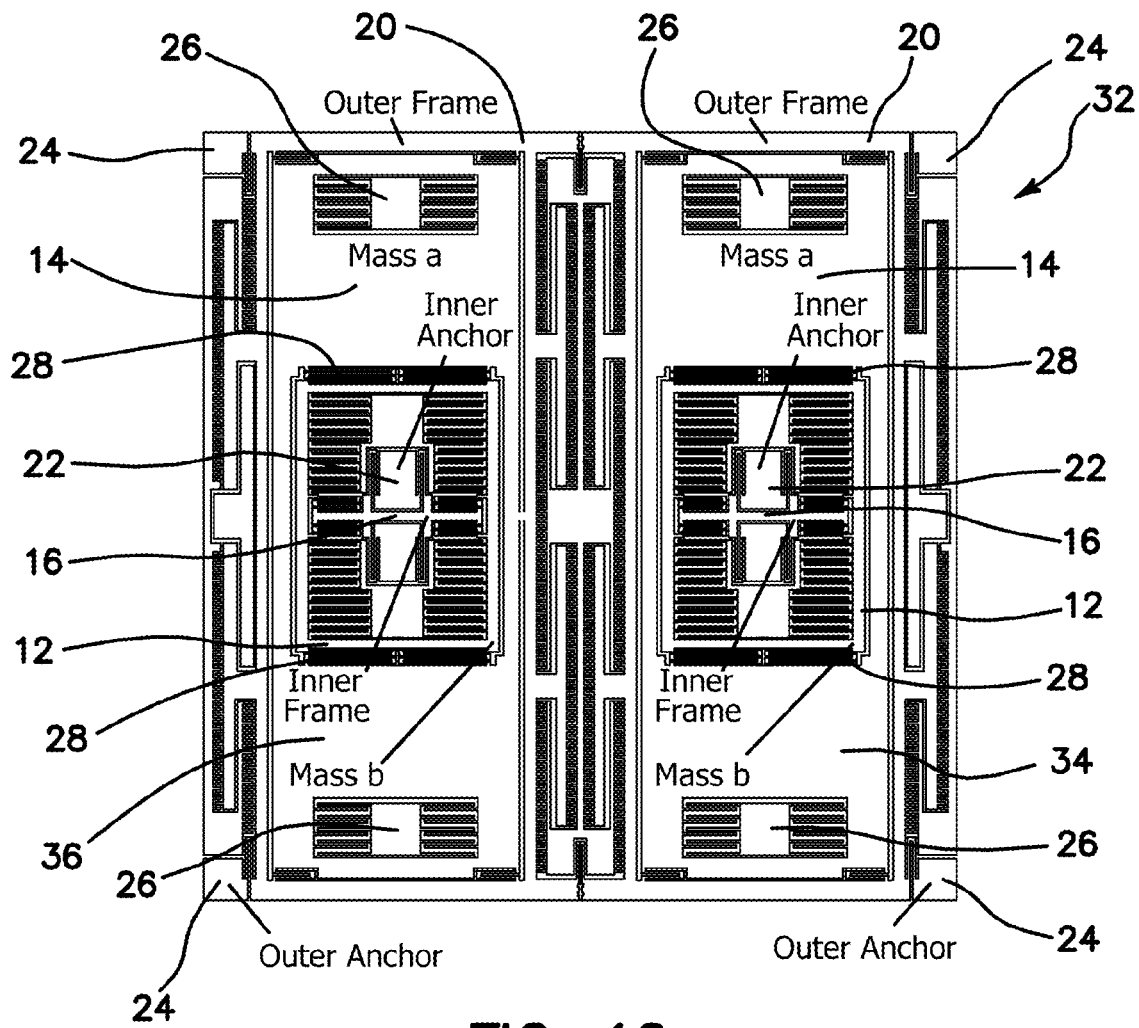
FIG. 10 is a top plan view of the tuning fork embodiment of the micromachined gyroscope.

In an alternative embodiment, the gyroscope 10 may be used as a tuning fork 32 that maintains the interchangeable operation in robust and precision modes presented above. A physical implementation of the tuning fork embodiment is shown in FIG. 10 which consists of two, fully coupled sense modes for the right tine 34 and left tine 36. Each tine 34, 36 comprises a sense mass $m_a$ 14, a sense mass $m_b$ 12, an inner anchor 22, an inner frame 16, an outer frame 20, and a plurality of parallel plate electrodes 26 and lateral comb electrodes 29. The tuning fork 32 differs from the previously described gyroscope 10 through the presence of two tines 34, 36 coupled in the drive mode forming a 2-DOF system. By driving the left and right tines 34, 36 into anti-phase motion, the overall tuning fork device 32 can reject common mode inputs, such as accelerations, while also allowing better momentum balance for increased quality factor operation.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A micromachined z-axis vibratory rate gyroscope formed on a substrate comprising:

an outer anchor;

an inner anchor;

an outer decoupling drive frame coupled to the outer anchor restrained to oscillate substantially only in a drive direction;

an inner decoupling drive frame coupled to the inner anchor restrained to oscillate substantially only in a drive direction, the inner and outer decoupling drive frames being decoupled from each other and both resiliently coupled to the substrate;

a first sense mass $m_a$ resiliently coupled to the outer decoupling drive frame and restrained to oscillate substantially only in the sense direction;

a second sense mass $m_b$ resiliently coupled to the inner decoupling drive frame and restrained to oscillate substantially only in the sense direction, the first and second sense masses $m_a$ and $m_b$ being independently resiliently coupled to each other to allow relative oscillation in the sense direction;

a drive electrostatic comb coupled to either the inner decoupling drive frame or the outer decoupling frame or both; and a sense electrostatic comb coupled to either the first sense mass or the second sense mass or both.

* * * * *